United States Patent Office 2,882,279
Patented Apr. 14, 1959

2,882,279

PREPARATION OF HALOGEN SUBSTITUTED POLYCYCLIC EPOXIDES

John P. Luvisi and Louis Schmerling, Riverside, Ill., assignors to Universal Oil Products Company, Des Plaines, Ill., a corporation of Delaware No Drawing. Application June 29, 1955
Serial No. 518,996

8 Claims. (Cl. 260—348)

This application is a continuation-in-part of our copending application Serial No. 399,630, filed December 21, 1953, now abandoned.

This invention relates to a process for preparing halogenated substituted polycyclic epoxides, and more particularly, to a process for preparing hexachloro-substituted pentacyclic epoxides.

An object of this invention is to prepare polyhalo substituted polycyclic epoxides.

A further object of this invention is to prepare novel compositions of matter comprising hexachloro substituted pentacyclic epoxides which are useful as insecticides and miticides.

One embodiment of this invention resides in a process which comprises reacting an unsaturated 1,2-epoxide with a conjugated cyclic diene, subsequently condensing the reaction product with a polyhalocycloalkadiene, and recovering the resultant condensation product.

A specific embodiment of the invention resides in a process which comprises reacting an unsaturated 1,2-epoxide with cyclopentadiene at a temperature in the range of from about 150° to about 190° C. and at a superatmospheric pressure to form an epoxyalkylbicyclic compound, subsequently condensing said compound with hexachlorocyclopentadiene, and recovering the resultant epoxyalkylhexachlorodimethanonaphthalene.

A more specific embodiment of the invention is found in a process which comprises reacting butadiene monoxide with cyclopentadiene at a temperature in the range of from about 150° to about 190° C. and at a superatmospheric pressure to form 5-epoxyethylbicyclo[2.2.1]-2-heptene, subsequently condensing said heptene with hexachlorocyclopentadiene, and recovering the resultant 2 - (epoxyethyl) - 5,6,7,8,9,9-hexachloro-1,2,3,4,4a,5,8,8a-octahydro-1,4,5,8-dimethanonaphthalene.

Yet another specific embodiment of the invention resides in a new composition of matter comprising 2-(epoxyethyl)-5,6,7,8,9,9-hexachloro-1,2,3,4,4a,5,8,8a-octahydro-1,4,5,8-dimethanonaphthalene.

Other objects and embodiments will be referred to in the following further detailed description of the invention.

It has now been discovered that compounds which are prepared by condensing conjugated polyhalocycloalkadienes with the reaction products of conjugated cycloalkadienes and unsaturated epoxides exhibit insecticidal and miticidal activity. In the process of this invention conjugated cyclic dienes are first reacted with unsaturated epoxides, and the products therefrom are then condensed with polyhalocyclicalkadienes to form the desired compounds.

Conjugated cyclic dienes which may be used in this reaction include 1,3-cyclopentadiene (usually, and hereinafter, referred to merely as cyclopentadiene), 1,3-cyclohexadiene, 1,3-cycloheptadiene, etc., alkyl substituted cyclic dienes such as 5-methylcyclopentadiene, 5,5-dimethylcyclopentadiene, 1,2,4-trimethylcyclopentadiene, 1-ethylcyclopentadiene, 1,2-dimethylcyclopentadiene, 1,2-diethylcyclopentadiene, etc., 1-methyl-1,3-cyclohexadiene, 1-ethyl-1,3-cyclohexadine, 1,2-dimethyl 1,3-cyclohexadiene, 1,5-di-methyl-1,3-cyclohexadiene, 5,6-di-methyl-1,3-cyclohexadiene, 1,5,6-trimethyl-1,3-cyclohexadiene, 1,5,6-triethyl-1,3-cyclohexadiene, etc.

The reactant which is condensed with the cyclic diene in the present process and which is referred to herein as an unsaturated epoxide may be selected from both the aliphatic and naphthenic mono- and polyolefinic series including particularly the 1,2-epoxides having the formula:

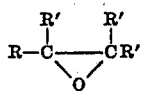

in which R is an aliphatic, cyclic, bicyclic or polycyclic hydrocarbon radical containing at least one non-aromatic double bond and R' is independently selected from the group consisting of hydrogen, alkyl, cycloalkyl, bicycloalkyl, and aryl radicals. Such epoxy compounds may be referred to as unsaturated 1,2-epoxides, the designation 1,2-indicating that the oxygen is attached to adjacent carbon atoms. Typical specific compounds of the unsaturated 1,2-epoxides include 3,4-epoxy-1-butene (butadiene monoxide), 3,4-epoxy-2-methyl-1-butene, 3,4-epoxy-2-ethyl-1-butene, 4,5-epoxy-2-pentene, 4,5-epoxy-1-pentene, 1,2-epoxy-3-hexene, 3,4-epoxy-1-hexene, etc., 3,4-epoxy-1-cyclohexene, 4,5-epoxy-1-cyclohexene, etc., 1-vinyl-1,2-epoxycyclohexane, etc., 3-(epoxyethyl)cyclohexene, etc., 5,6-epoxy-1,3-hexadiene, 5-(epoxyethyl)bicyclo[2.2.1]-2-heptene, etc.

The condensation of an unsaturated 1,2-epoxide with a conjugated cyclic diene in accordance with this invention occurs at temperatures ranging from about 50° C. to about 250° C. and preferably within the range of from 80° C. to about 200° C. In addition, the reaction proceeds at atmospheric or superatmospheric pressures ranging to about 100 atmospheres or more, the preferred range being from about 1 to about 75 atmospheres. The superatmospheric pressures used in this reaction may be provided by the introduction of an inert gas such as nitrogen into the closed reaction chamber. The reaction conditions under which this condensation will be carried out will depend largely upon the particular reactants undergoing reaction.

The proportion of conjugated cyclic dienes to unsaturated epoxides will depend upon the particular condensation product desired. For example, when the epoxide of a bicyclic hydrocarbon is desired, the molar proportion of conjugated cyclic diene to unsaturated epoxide will be 1:1. The reaction will proceed chiefly according to the following equation:

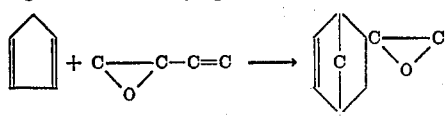

However, if a pentacyclic derivative is desired, as chief product, 2 moles of the conjugated cyclic diene are reacted with 1 mole of olefinic epoxide, while, if an heptacyclic epoxide is desired, 3 moles of a conjugated cyclic diene is reacted with 1 mole of olefinic epoxide.

The polycyclic epoxides which result from the above metioned reaction are then condensed with a conjugated polyhalocycloalkadiene. Typical specific exemplary compounds of these halogen-substituted cyclic dienes include 5-chlorocyclopentadiene, 5,5-dichloro-cyclopentadiene, 5-bromocyclopentadiene, 5,5-dibromocyclopentadiene, 1,2,4-trichlorocyclopentadiene, 1,5,5-trichlorocyclopentadiene, 1,4,5,5-tetrachlorocyclopentadiene, 1,2,3,5,5 - pentachlorocyclopentadiene, hexachlorocyclopentadiene, hexabromocyclopentadiene, etc., 1-chloro-1,3-cyclohexadiene, 1,2 - dichloro-1,3 - cyclohexadiene, 1-bromo-1,3-cyclohexadiene, octachloro-1,3-cyclohexadiene, etc., 1-chloro-1,3-cycloheptadiene, 1,2-dichloro-1,3-cycloheptadiene, 1,2,3-trichloroheptadiene, 1,2,3,4,5,5-hexachloro-1,3-cycloheptadiene, decachloro-1,3-cycloheptadiene, etc.

The condensation of the polyhalocycloalkadiene with the polycyclic epoxide is also carried out at temperatures ranging from about 50° C. to about 250° C. and preferably within the range of from 80° C. to about 200° C. In addition, the reaction proceeds at atmospheric or superatmospheric pressures ranging to about 100 atmospheres or more, the preferred range being from about 1 to about 75 atmospheres.

Examples of the halogen-substituted polycyclic epoxides which result from this condensation, and constitute new compositions of matter, include 2-(epoxyethyl)-5,6,7,8,9,9-hexachloro-1,2,3,4,4a,5,8,8a-octahydro-1,4,5,8-dimethanonaphthalene, 2-(1,2-epoxypropyl)-5,6,7,8,9,9-hexachloro-1,2,3,4,4a,5,8,8a-octahydro-1,4,5,8-dimethanonaphthalene, 2-(1,2-epoxybutyl)-5,6,7,8,9,9-hexachloro-1,2,3,4,4a,5,8,8a-octahydro-1,4,5,8-dimethanonaphthalene, 2-(1,2-epoxypropyl)-3-methyl-5,6,7,8,9,9-hexachloro-1,2,3,4,4a,5,8,8a-octahydro-1,4,5,8-dimethanonaphthalene, 2-(1,2-epoxy-2-methylpropyl)-5,6,7,8,9,9-hexachloro-1,2,3,4,4a,5,8,8a-octahydro-1,4,5,8-dimethanonaphthalene, 2-(1,2-epoxycyclohexyl)-5,6,7,8,9,9-hexachloro-1,2,3,4,4a,5,8,8a-octahydro-1,4,5,8-dimethanonaphthalene.

It is to be understood that the above mentioned compounds are only examples of the class of compounds which may be prepared according to the process of the invention, and that said process is not necessarily limited thereto.

The process of this invention may be effected in any suitable manner and may be either a batch or continuous type of operation. When a batch type operation is used, a quantity of the starting material, namely the conjugated cyclic diene and the unsaturated 1,2-epoxide is placed in a reaction vessel such as a reaction vessel such as a pressure autoclave and reacted at superatmospheric pressure and elevated temperatures hereinbefore set forth. A suitable means of providing the aforesaid superatmospheric pressure is by the introduction of an inert gas such as nitrogen or hydrogen into the reaction vessel. Alternatively the pressure may be the vapor pressure of the reactants. The reactor is heated to the desired temperature and the reaction proceeds toward completion, after which the reactor and the contents thereof are allowed to cool to room temperature and the pressure reduced. The reaction product is then separated from the unreacted material by conventional means, for example, by fractional distillation, fractional crystallization, etc., while the unreacted starting materials may be recycled for further use. The reaction product may then be returned to the reaction vessel or placed in a second reaction vessel along with the polyhalocycloalkadiene such as hexachlorocyclopentadiene and heated to a predetermined temperature. At the end of the desired residence time the vessel and contents are cooled to room temperature and the desired condensation product is separated by conventional means hereinbefore set forth from any unreacted feed stock.

Another method of operation of the present process is of the continuous type. In this method the reactants are admitted by separate means or as a mixture, into a reactor which is maintained at the proper condensation conditions of temperature and pressure. The reaction zone in which this condensation takes place may be an unpacked vessel or coil, or it may contain an adsorbent packing material such as fire brick, alumina, hydrated bauxite, and the like. When the reaction has proceeded to completion, the product thereof will be continuously withdrawn from the reaction zone and separated from the unreacted starting materials by means of fractional distillation. The unreacted compounds consisting of the conjugated cyclic dienes and the unsaturated 1,2-epoxide may be recycled for reuse as a portion of the starting materials.

The reaction product is then continuously charged to a second reactor which is also maintained at the proper operating conditions of temperature and pressure. The polyhalocycloalkadiene is also continuously charged to the second reactor in a separate stream, or commingled with the epoxy polycyclic compound prior to admission. The condensation product is also continuously withdrawn, separated from unreacted feed stock and purified by conventional means, while the unreacted feed stock is recycled.

The condensation reaction of the present invention may be carried out in the presence of inert organic solvents such as aromatic and alkylated aromatic compounds including benzene, toluene, xylene, etc., saturated aliphatic alcohols including ethanol, propanol, butanol, etc., or ethers including diethyl ether, dipropyl ether, methyl ethyl ether, methyl propyl ether, diphenyl ether, diethyl phenyl ether, etc.

The physical properties of the present adducts of a polyhalocycloalkadiene and the reaction product of a conjugated cyclic diene and an unsaturated epoxide, and the effects they have on entomological forms of life make them particularly desirable as insecticides and miticides, the particular compounds having many of the features desired for this purpose. They are for example, toxic to insects and mites which are destructive of plant life and materials normally subject to insect infestation, their toxic effects being manifested by contact of the poison with the insect. The insecticides and miticides comprising the present compounds are effective against chewing as well as such types of insects. The compounds are sufficiently volatile so that when applied to plant life intended for subsequent human consumption the plants, when harvested and after allowing a reasonable time for evaporation of the applied insecticide therefrom, retain none of the toxicant to prevent use of the plant for food. On the other hand, the compounds are of sufficiently limited volatility to be retained on the insect or the mite for the time required to accomplish the toxic effects of the compound. The volatility and retentive capacity of the compounds may be varied at will by combining them with suitable fixing agents which reduce or promote their volatilization, as desired. Thus, the compounds may be dissolved in a suitable high boiling solvent such as a mineral or vegetable oil, petroleum, etc.; a wax such as paraffin wax, beeswax; a high molecular alcohol or ether such as myricyl alcohol, dibutyl ether, etc.; or they may be emulsified with water or combined with an oil and emulsified with water by the addition of an emulsifying agent such as a surface active agent to the mixture of components. The latter solvents and dispersants may also be employed for the specific purpose of reducing the concentration of the active components to the desired level in a specific insecticidal formulation. The particular formulation of active components in composition with the solvent or dispersant will depend upon its application. A composition containing as high as 20% of active component may be preferred in some instances where deep penetration of the insecticide is desired, as in the treatment of fibrous materials for extinction of a particular infestation. For other purposes, the required concentration of active component in the formulation may be as low as 0.1%.

In utilizing the present insecticidal and miticidal compounds against most insects and mites, a compound containing from about 0.1 to about 5% by weight of active component is highly effective. The choice of the most desirable solvent or dispersant further depends upon the method utilized to apply the insecticidal compound to the infected article. For example, a low molecular weight, normally gaseous carrying agent for the active insecticidal composition, such as propane, butane, the Freons, etc., may be compressed and liquified into a small bomb containing the insecticide. Upon release of pressure from the bomb, the liquified carrier vaporizes and suspends a quantity of the active component thereon, thus providing a convenient spraying method for applying the insecticides. The active component may also be dissolved in a liquid carrier such as kerosene, an alcohol, ester, ketone, etc., and the resulting solution atomized by a suitable spraying device.

The following examples are given to illustrate the process of this invention which, however, are not intended to limit the generally broad scope of the present invention in strict accordance therewith.

EXAMPLE I

A mixture of 50 g. of cyclopentadiene and 30 g. of butadiene monoxide was heated at a temperature ranging from 150° to 190° C. during a period of 4.5 hours in a glass-lined rotating autoclave of 850 cc. capacity, the autoclave having been placed under an initial nitrogen pressure of 50 atmospheres. At the end of this time the autoclave and the contents thereof was allowed to cool to room temperature, the reaction product taken up in toluene, and distilled under reduced pressure yielding the following fractions: (1) 24 g. of a product having a boiling point of 69–70° C. at 10 mm. (or about 191–192° C. at 760 mm.); (2) 16 g. of a product having a boiling point of 117–121° C. at 3 mm. (or about 286–290° C. at 760 mm.); and (3) 2 g. of a product having a boiling point of about 165–180° C. at 3 mm. (or about 350–370° C. at 760 mm.) and a melting point of about 105° C. The above mentioned fractions were analyzed and it was found that they consisted of the product of the reaction of butadiene monoxide with 1, 2 and 3 moles respectively of cyclopentadiene and that they had the following formulas respectively:

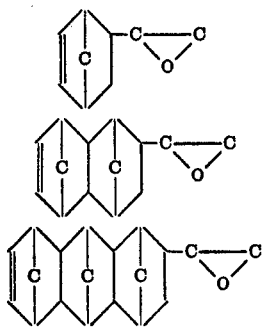

Fraction 1 was 5-(epoxyethyl)bicyclo[2.2.1]-2-heptene.
*Analysis of fraction 1.*—Found: C, 79.95; H, 9.12. Calculated for $C_9H_{12}O$: C, 79.37; H, 8.88.
*Analysis of fraction 2.*—Found: C, 86.60; H, 9.03. Calculated for $C_{14}H_{18}O$: C, 83.12; H, 8.97.
*Analysis of fraction 3.*—Found: C, 84.30; H, 9.03. Calculated for $C_{19}H_{24}O$: C, 85.02; H, 9.01.

10 g. of 5-(epoxyethyl)bicyclo[2.2.1]-2-heptene which was prepared as described above and 20 g. of hexachlorocyclopentadiene were admixed along with 15 g. of toluene and the solution heated under reflux conditions at a temperature of approximately 124° C. for a period of 14 hours. The reaction product was subjected to fractional distillation under reduced pressure and 18 g. of a liquid adduct having a boiling point of 403° to 406° C. at 760 mm. pressure was obtained. That this adduct was the desired 2-(epoxyethyl)-5,6,7,8,9,9-hexachloro-1,2,3,4,4a,5,8,8a-octahydro-1,4,5,8-dimethanonaphthalene was indicated by its analysis.
Found: C, 41.28; H, 3.21; Cl, 52.04. Calculated for $C_{14}C_{12}Cl_6O$: C, 41.11; H, 2.96; Cl, 52.02.

EXAMPLE II

The insecticidal and miticidal activity of the type of compound prepared according to the invention was determined using house flies, pea aphids, red spider mites and 2-spotted mites. A solution of 2-(epoxyethyl)-5,6,7,8,9,9-hexachloro-1,2,3,4,4a,5,8,8a-octahydro-1,4,5,8-dimethanonaphthalene was prepared by dissolving 1.5 g. of the compound in 2 cc. of benzene and emulsifying the resulting solutions with 150 cc. of water using Triton X–100 as an emulsifying agent. The results of these tests are shown in Table I below:

Table I

| | Houseflies, 24 hours | Red Spider mite, 5 days | 2-Spotted mite, 5 days |
|---|---|---|---|
| Concentration, percent | 1 | 0.5 | 0.2 | 0.5 |
| Percent Kill | 70 | a 100 | a 100 | a, b 100 | a Ovicidal.
b 35% kill at 0.1% concentration.

We claim as our invention:
1. A process which comprises reacting butadiene monoxide with cyclopentadiene at a temperature of from about 50° to about 250° C. to form 5-(epoxyethyl)bicyclo[2.2.1]-2-heptene and subsequently condensing said heptene with hexachlorocyclopentadiene at a temperature of from about 50° to about 250° C. to form 2-(epoxyethyl) - 5,6,7,8,9,9 - hexachloro - 1,2,3,4,4a,5,8,8a-octahydro-1,4,5,8-dimethanonaphthalene.

2. A process which comprises reacting 3,4-epoxy-1-pentene with cyclopentadiene at a temperature of from about 50° to about 250° C. to form 5-(1,2-epoxypropyl)bicyclo[2.2.1]-2-heptene and subsequently condensing said heptene with hexachlorocyclopentadiene at a temperature of from about 50° to about 250° C. to form 2 - (1,2 - epoxypropyl) - 5,6,7,8,9,9 - hexachloro - 1,2,3,4,4a,5,8,8a-octahydro-1,4,5,8-dimethanonaphthalene.

3. The compound 2 - (epoxyethyl) - 5,6,7,8,9,9 - hexachloro - 1,2,3,4,4a,5,8,8a - octahydro - 1,4,5,8 - dimethanonaphthalene.

4. A process which comprises reacting at a temperature of from about 50° to about 250° C. an unsaturated 1,2-epoxide selected from the group consisting of 3,4-epoxy-1-butene, 3,4 - epoxy - 2 - methyl - 1 - butene, 3,4 - epoxy-2 - ethyl - 1 -butene, 4,5 - epoxy - 2 - pentene, 4,5 - epoxy-1-pentene, 1,2-epoxy-3-hexene, 3,4-epoxy-1-hexene, 3,4-epoxy-1-cyclohexene, 4,5-epoxy-1-cyclohexene, 1-vinyl-1,2-epoxy-cyclohexane, 3-(epoxyethyl)-cyclohexene, 5,6-epoxy-1,3-hexadiene, 5-(epoxyethyl)bicyclo[2.2.1]-2-heptene with a conjugated cyclic diene selected from the group consisting of cyclopentadiene, cyclohexadiene, cycloheptadiene and their alkyl derivatives, and condensing the resultant reaction product at a temperature of from about 50° to about 250° C. with a polyhalocycloalkadiene in which the halogen is selected from the group consisting of chlorine and bromine and in which the cycloalkadiene component is a member of the group consisting of cyclopentadiene, cyclohexadiene and cycloheptadiene.

5. The process of claim 4 further characterized in that each of said reactions is effected at a temperature of from about 80° C. to about 200° C.

6. A process which comprises reacting cyclopentadiene at a temperature of from about 50° to about 250° C. with an unsaturated 1,2-epoxide selected from the group consisting of 3,4-epoxy-1-butene, 3,4-epoxy-2-methyl-1-butene, 3,4-epoxy-2-ethyl-1-butene, 4,5-epoxy-2-pentene, 4,5-epoxy-1-pentene, 1,2-epoxy-3-hexene, 3,4-epoxy-1-hexene, 3,4-epoxy-1-cyclohexene, 4,5-epoxy-1-cyclohexene, 1-vinyl-1,2-epoxy-cyclohexane, 3-(epoxyethyl)-cyclohexene, 5,6-epoxy-1,3-hexadiene, 5-(epoxyethyl)bicyclo[2.2.1]-2-heptene, and condensing the resultant reaction product with hexachlorocyclopentadiene at a temperature of from about 50° to about 250° C.

7. The process of claim 6 further characterized in that the first-mentioned reaction is effected at a temperature of from about 150° C. to about 190° C. and the second-mentioned reaction is effected at a temperature of from about 80° C. to about 200° C.

8. A compound selected from the group consisting of 2 - (epoxyethyl) - 5,6,7,8,9,9 - hexachloro - 1,2,3,4,4a,5,8,8a - octahydro - 1,4,5,8 - dimethanonaphthalene, 2 - (1,2 - epoxypropyl) - 5,6,7,8,9,9 - hexachloro - 1,2,3,4,4a,5,8,8a - octahydro - 1,4,5,8 - dimethanonaphthalene, 2 - (1,2 - epoxybutyl) - 5,6,7,8,9,9 - hexachloro - 1,2,3,4,4a,5,8,8a - octahydro - 1,4,5,8 - dimethanonaphthalene, 2 - (1,2 - epoxypropyl) - 3 - methyl - 5,6,7,8,9,9 - hexachloro - 1,2,3,4,4a,5,8,8a - octahydro - 1,4,5,8 - dimethanonaphthalene, 2 - (1,2 - epoxy - 2 - methylpropyl) - 5,6,7,8,9,9 - hexachloro - 1,2,3,4,4a,5,8,8a - octahydro-1,4,5,8-dimethanonaphthalene, and 2-(1,2-epoxycyclohexyl - 5,6,7,8,9,9 - hexachloro - 1,2,3,4,4a,5,8,8a - octahydro-1,4,5,8-dimethanonaphthalene.

References Cited in the file of this patent
UNITED STATES PATENTS

| | | |
|---|---|---|
| 2,616,899 | Ladd | Nov. 4, 1952 |
| 2,676,131 | Soloway | Apr. 20, 1954 |
| 2,676,132 | Bluestone | Apr. 20, 1954 |